Nov. 22, 1949     C. J. STALEGO     2,489,243
METHOD AND APPARATUS FOR MAKING FINE GLASS FIBERS
Filed April 27, 1944     3 Sheets-Sheet 1
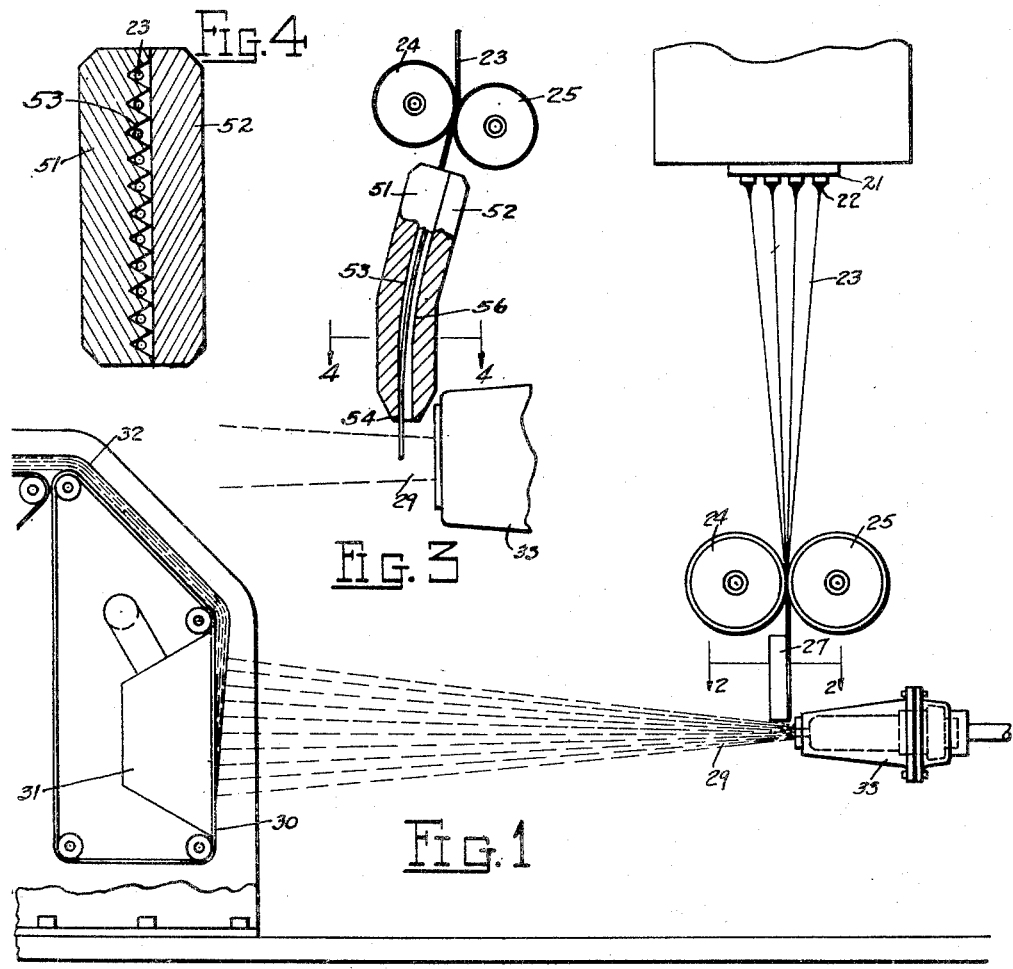
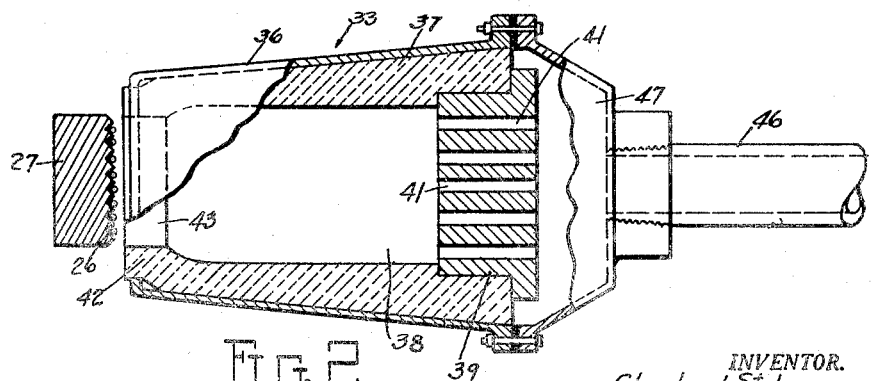
INVENTOR.
Charles J. Stalego

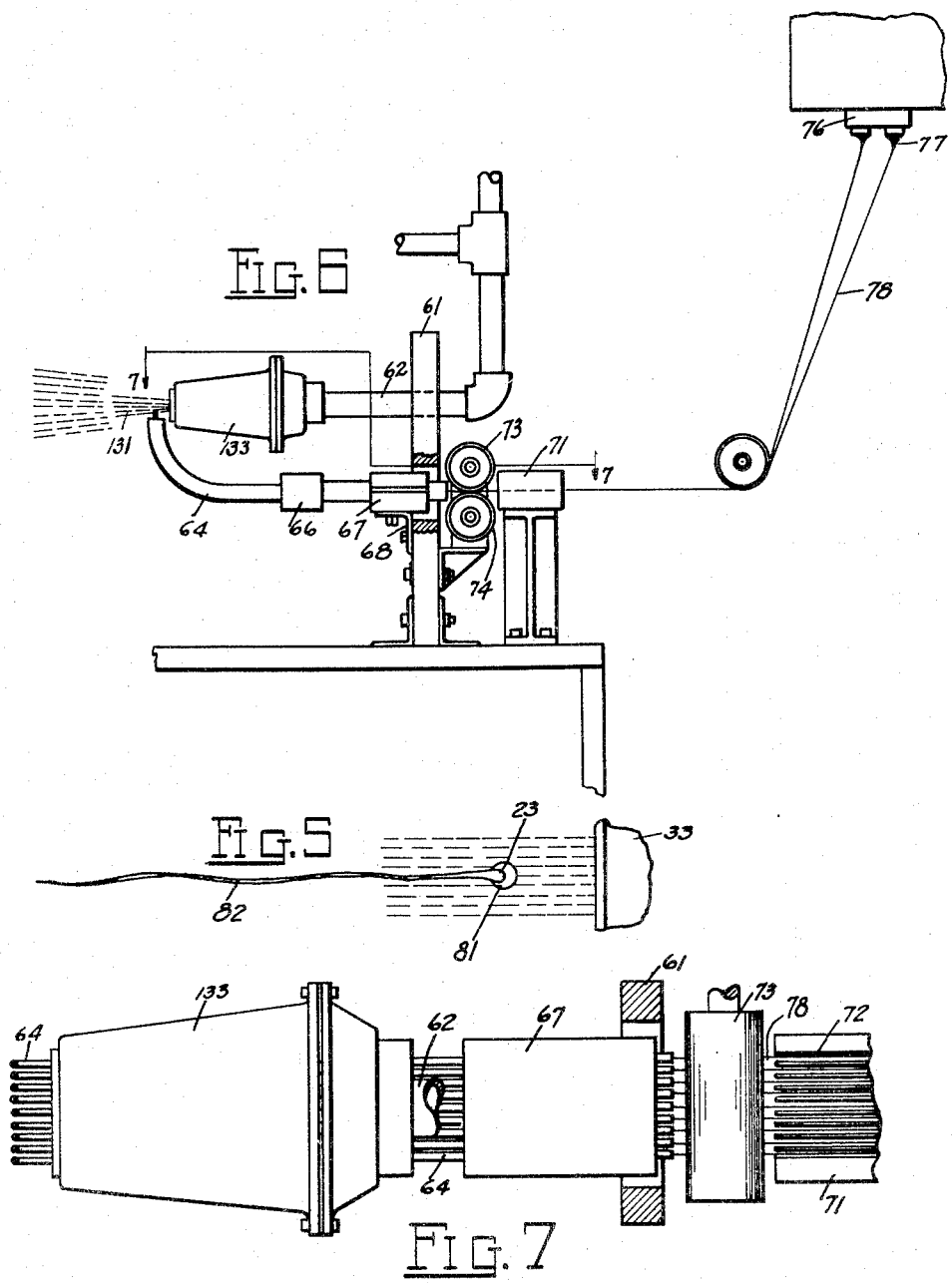

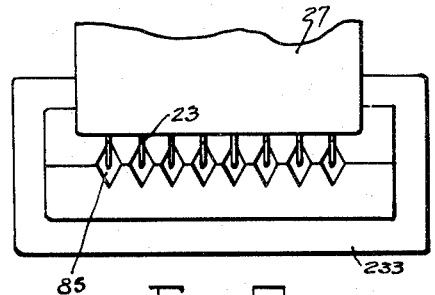
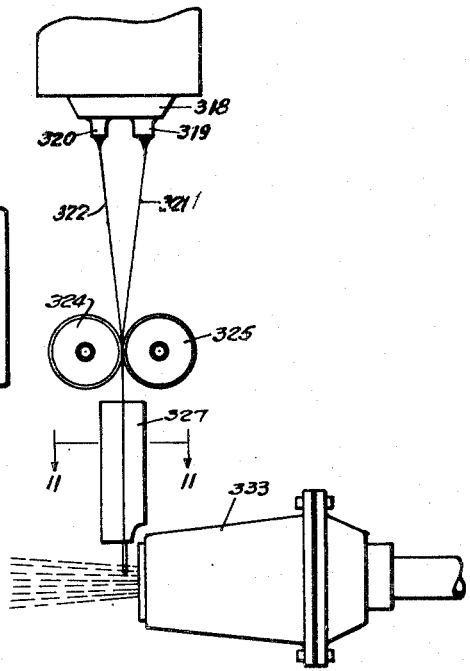
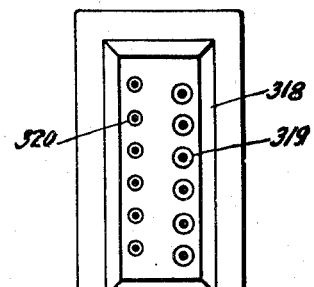
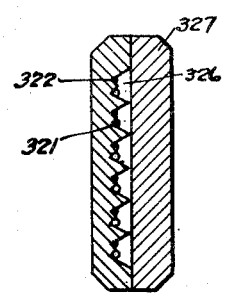
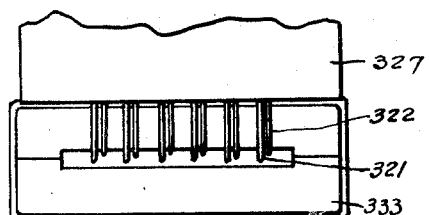

Patented Nov. 22, 1949

2,489,243

UNITED STATES PATENT OFFICE

2,489,243

METHOD AND APPARATUS FOR MAKING FINE GLASS FIBERS

Charles J. Stalego, Newark, Ohio, assignor to Owens-Corning Fiberglas Corporation, a corporation of Delaware Application April 27, 1944, Serial No. 533,046

21 Claims. (Cl. 18—2.5)

This invention relates to the production of fibrous material and particularly to the production of glass fibers by engaging glass with a gaseous blast for attenuating the glass continuously to the form of fine fibers.

The invention provides improvements of the process in which a rod or filament of heat-softenable material such as glass is fed into an intensely hot blast moving at high speed. The rod is melted by the heat of the blast and as it melts is drawn out into a fiber by the force of the blast. The blast is formed by burning a combustible fuel and air mixture, preferably a mixture of fuel gas and air, in a chamber that is enclosed save for a relatively small orifice through which the products of combustion are exhausted. The blast thus created converts the glass engaged thereby at a high rate into fine fibers.

It is an object of the present invention to improve this process to enable the production of finer fibers at high rates. This is achieved by increasing the rate and degree of attenuation of the glass so that not only may finer fibers be produced but the rods or filaments from which the fibers are attenuated may be larger with attendant advantages.

It is another object to provide an improved process whereby fine glass fibers may be made with a high degree of uniformity and under accurate control of fiber size.

It is another object to increase the efficiency of the fiber-forming process so that very fine fibers may be made at relatively low cost. More specifically, it is an object to increase the rate of production of fibers and also to increase the rate of production relative to the amount of fuel consumed in forming the blast. The invention accomplishes this first object by increasing the speed of the blast, and the second; by increasing the number of rods or filaments that may be fed concurrently into the blast to be attenuated by the blast.

The present invention concerns broadly the conception that finer glass fibers of greater uniformity may be produced commercially at very favorable rates if the glass rod or filament is fed into an intensely hot blast in certain directions relative to the direction of travel of the blast, the blast being a unitary body of hot gases traveling at high rate.

Previously the glass rod or filament was fed into a melting and attenuating blast formed by two or more converging flames, the direction of feed of the rod or filament generally bisecting the angle between the converging flames. The filament moved into the melting and attenuating blast in a direction approximately parallel with the direction of travel of the blast.

With this manner of introduction of the filament into the blast, the attenuating force is, of course, generally lengthwise of the filament being fed into the blast. Consequently, as soon as the filament softens it begins to elongate under the influence of the attenuating force, and to move into the blast at an accelerated rate. This accelerated movement of the filament carries the filament through the portion of the blast adjacent the origin of the blast, which is at the highest velocity and highest temperature, at such a rapid rate that the full heating and attenuating effect of the blast may not be realized. As a result the glass filament may not reach the temperature at which attenuation is most efficient and especially not while in the portion of the blast that is at the highest temperature and velocity. The highest degree of attenuation, the finest fibers, and the highest possible rate of production are consequently not always realized.

It has been found that advantages by way of increased efficiency, greater uniformity of the fibers, and better control of the degree of attenuation are realized if the glass rods or filaments are fed into the blast in a direction that is at substantially a right angle to the direction of travel of the blast. There are believed to be several reasons why improved operation results from this manner of feeding.

In the first place, the attenuating force is normal to the filament and there is therefore little tendency for the filament to elongate until the glass reaches the temperature and viscosity at which attenuation efficiently takes place. Secondly, the temperature gradient along the portion of the filament entering the blast is highest when the filament enters the blast at a right angle, and the filament passes from the solid state to the attenuation viscosity at such a high rate that the intermediate softened state where lengthening or other deformation can occur exists for a time so short that it has little if any effect on the operation. Furthermore, the attenuation temperature and viscosity are reached as close as possible to the point along the length of the blast at which the filament is fed into the blast, which in the interest of efficiency is as close as possible to the point of origin of the blast. It follows that the filament fed at a right angle into the blast is raised to the attenuating temperature while in the part of the blast that is hottest and at the highest velocity so that attenuation is at the greatest efficiency.

This and other features of the invention will be described in more detail with reference to the drawings, in which:

Figure 1 is a diagrammatic elevational view of one type of apparatus for carrying out the present invention;

Figure 2 is a horizontal cross-sectional view taken on the line 2—2 of Figure 1 and with the burner broken open and shown partly in section;

Figure 3 is an enlarged elevational detail view showing a modified form of filament guide, and partly in cross-section;

Figure 4 is a cross-sectional detail view taken in the plane of the line 4—4 of Figure 3;

Figure 5 is a bottom plan schematic view illustrating the manner of attenuation of the present invention;

Figure 6 is an elevational view showing a modification of the apparatus employed to perform the present invention, and partly in cross-section;

Figure 7 is a cross-sectional view of the same taken on the line 7—7 of Figure 6;

Figure 8 is a diagrammatic detail end view showing a further modification of the present invention;

Figure 9 is a diagrammatic elevational view showing another modification of the apparatus employed in the present invention;

Figure 10 is a fragmentary bottom view of the bushing forming part of the apparatus illustrated in Figure 9;

Figure 11 is a cross-sectional view taken on the line 11—11 of Figure 9; and

Figure 12 is a side elevational view of a portion of the apparatus of Figure 9.

Although the invention will be particularly described for the production of fine fibers from glass, since it is primarily for this purpose that the invention has been developed, other materials having the properties of being softened when heated and while softened capable of being attenuated, for instance, most thermoplastic resins, may also be converted to fibers by practicing the present invention.

Referring to Figures 1 to 4, the apparatus comprises a feeder or bushing 21 for feeding a plurality of streams 22 of molten glass that are attenuated into glass filaments 23 by coacting rollers 24, 25 driven by any suitable means. The filaments emerging from between the rollers pass through grooves 26 cut in one face of a vertically disposed guide plate 27. The function of the grooved plate is to guide the filaments in the desired path and maintain them in definite spaced relation.

At the lower end of the plate 27 the filaments feed into a high speed gaseous blast 29 moving in a path that is substantially at a right angle to the direction of feed of the filaments into the blast. The blast is intensely hot so that as the filaments move into the blast they are melted and the molten glass is drawn out by the force of the blast into fine glass fibers. The fibers are borne by the blast to a suitable collecting means such as an endless foraminous conveyor 30 traveling over a suction box 31 that causes a flow of air through the conveyor to aid in deposition of the fibers in the form of a mat 32.

The angular relation between the blast and the filaments may be varied to some extent without seriously affecting the operation. Generally, deviations of about 5 or 10° in either direction from a right angle has very little effect on the mode of attenuation so that a high degree of accuracy in the relation of the guide for the filaments to the blast is not required.

The blast is formed preferably by a burner of the type illustrated at 33. This burner comprises a sheet metal shell 36 enclosing a refractory body 37 having a chamber 38 therein. One end of the chamber is formed by a wall 39 having a plurality of passages 41 extending therethrough. The other end of the chamber is formed by a wall 42 having a port 43 therein. This port is of substantially less cross-sectional area than the cross-sectional area of the chamber 38, being usually about ⅛ to ⅜ the area of the chamber.

A combustible gaseous mixture, for instance a mixture of fuel gas, either natural or manufactured, and air is fed to the burner through a pipe 46 that connects with an inlet chamber 47 formed between the end of the sheet metal casing and the wall 39 of the refractory body. From the inlet chamber 47 the combustible gaseous mixture passes through the orifices 41 and into the chamber 38 where it is ignited. The products of combustion from the gas burned in the chamber 38 pass through the port 43 and are here accelerated, due to the restricted area of the port, to create a high speed blast of intense heat capable of melting and attenuating the filaments 23 to very fine fibers at a high rate.

At the beginning of the operation the gaseous mixture is fed into the chamber 38 at velocities below the rate of flame propagation of the mixture in the atmosphere, but as the refractory walls heat up the rate of feed of the gas into the chamber is increased above this rate. The aim, in the interest of highest efficiency, is to feed as much gaseous mixture into the chamber as possible without causing the combustion to become unstable or take place at the outside of the chamber or to cease altogether.

The guide 27 for guiding the filaments in spaced paths into the blast utilizes the force of the blast upon the filaments to maintain the filaments within the grooves 26 of the guide. To more positively maintain the fibers in their proper position at all times the modified guide illustrated in Figures 3 and 4 may be employed. This guide is in the form of a plate divided into two sections 51 and 52 along a substantially central plane. The inner face of the section 51 of the plate is provided with grooves 53 which form guiding passages for the filaments. Intermediate their ends the passages may be deflected so that the lower portion 56 of the passage is at a slight angle to the upper portion of the passage. As a result the filaments passing through the passage are bent slightly, and the resiliency of the filaments causes them to be urged against the outer edge 54 of the bottom portion of the passage. The guide is so mounted with respect to the burner 33 that the force of the blast from the burner urges the filaments in the same direction that they are urged by their tendency to straighten out in the passage. As a result any tendency of the filaments to move about under the action of the blast is overcome and they feed into the blast in a fixed path.

As the filaments feed into the blast they are quickly melted by the heat of the blast and the molten glass is drawn out by the force of the blast into very fine glass fibers.

This action is illustrated diagrammatically in Figure 5. The end of each filament 23 as it melts forms a small body 81 of molten glass that is drawn out continuously by the blast into a fine fiber 82. The right-angular relation of the blast and the filament assures rapid melting of the filament with little tendency for the filament to elongate prior to the reaching of proper attenuating viscosity by the glass. This viscosity is reached within the part of the blast that is hottest and at the highest velocity and the small body of molten glass is held by the filament in this part of the blast so that the blast may act on the molten glass and draw it out. Because of the intense heat of the blast the attenuation extends over a relatively great distance so that the molten glass is drawn down to a substantial degree. This manner of feeding the filaments into a blast of intensely hot gas permits the formation of fibers as small as one hundred-thousandth of an inch or less in diameter, and further provides a high degree of uniformity of these fine fibers.

The size of the fibers attenuated by the gaseous blast may be varied in several ways, e. g., by varying the force and heat of the blast, by varying the size of the primary filaments, or by varying the rate at which primary filaments are fed into the blast. Usually, high efficiencies are achieved by feeding primary filaments of from .005 to .010 inch in diameter into the gaseous blast at rates of from 8 to 18 feet per minute to produce blast-attenuated fibers of from .00001 to .00010 inch in diameter. Other sizes and rates may be resorted to without, of course, departing from the invention, these figures being given primarily for purposes of illustration to aid in understanding the invention.

It is evident from these examples that by the present invention it is possible to achieve a degree of attenuation accounting for a reduction in size of the primary filaments of as high as 500 times. As a consequence, material advantages are realized due to the use of larger primary filaments and the greater ease with which these larger filaments may be produced and operated on in the process.

Figures 6 and 7 show a modified form of apparatus in which a standard 61 is mounted on a suitable base. A pipe 62 passes through an opening in the standard to be supported thereby and is provided at its forward end with a burner 133, which may be similar in all respects to the burner 33. Beneath the burner there is a plurality of horizontally disposed tubes 64 bent substantially 90 degrees at their forward end so that the ends of the tubes are directed upwardly toward the blast issuing from the burner 133. A bracket 66 is suitably clamped to the tubes to maintain them in aligned position and the tubes are clamped adjacent their rear ends in a clamp 67 secured by means of a bracket 68 to the standard 61.

Spaced rearwardly from the standard 61 a guide block 71 is mounted on the face and provided with a plurality of slots 72 through which the filaments pass. Between the guide 71 and the ends of the tubes 64 a pair of coacting feeding rolls 73, 74 are mounted on a bracket fastened to the standard. The guide 71 is for the purpose of maintaining the filaments aligned with the tubes 64 as the filaments pass through the rolls 73, 74.

The filaments fed to the blast from the burner 133 may be taken from a suitable source such as a spool or reel of filaments wound into a package. Alternatively the filaments may be formed continuously as they are fed to the blast as in the first form of the invention. In the latter case a bushing or feeder 76 is arranged to flow a plurality of streams 77 of molten glass and these streams are attenuated to filaments 78 by suitable means such as the rollers 73, 74.

As in the case of the filament guides shown in Figures 1 and 3, the forward ends of the tubes 64 are bent to such an angle that the filaments passing through the tubes enter the blast at substantially a right angle and the tendency of the filaments to straighten out urges the ends of the filaments against the forward edge of the end of the passages through the tubes so that the filaments are directed through fixed paths into the blast.

In Figure 8 is illustrated a modified form of burner. In this form the port of the burner 233, instead of being formed as an elongated slot, is in the form of a series of spaced orifices 85. The orifices are shown as being substantially diamond-shaped but they may be circular, oval or rectangular if desired. The diamond shape is preferred, however, as permitting closer spacing of the orifices.

With this form of orifice the products of combustion resulting from ignition of the combustible gaseous mixture within the burner are divided into a plurality of spaced blasts of increased velocity. The filaments 23 are fed into the individual blasts preferably centrally thereof to be melted and attenuated into fine fibers. In this way the highest velocity of the blast is in the immediate vicinity of the filaments so that the efficiency of the operation is increased.

Figures 9, 10, 11 and 12 illustrate a modification of the invention by which an increased rate of production is achieved. In this form of the invention the feeder or bushing 318 is provided with a plurality of orifices for flowing streams of molten glass. The orifices of one series, for instance the row 319, are of a slightly larger diameter than the orifices of the other series or row 320 so that the streams of molten glass flowing from the orifices are of relatively different diameters. As these streams are attenuated into filaments 321, 322 by the rollers 324, 325, the filaments are likewise of relative different diameters, the larger orifices of course resulting in the larger filaments 321. For present purposes, the difference in diameter of the filaments may be in the order of .001 to .003 of an inch, and the different size filaments are preferably slightly above and below the diameter of the filaments required to produce the desired size fibers so that the average diameter of the fibers made from these filaments of different size will closely approximate the desired diameter.

One large and one small filament are fed as a pair through a passage 326 in a guide 327 and are fed in this relation into the blast from the burner 333. As illustrated in Figure 12, the smaller filament is melted and attenuated by the blast from the burner at the point slightly above the point at which the larger filament is melted and attenuated. Also, the smaller filament is flexed by the force of the blast slightly more than the larger filament so that the points where two adjacent filaments are melted and attenuated are spaced apart a small distance lengthwise of the blast as well as vertically. Since the melting and attenuation of the two filaments occurs at spaced points, the two filaments may be fed into the blast in much closer side-by-side relation than if they were the same size and consequently were melted and attenuated at points that were equal distances within the blast. In the latter case the spacing necessary to prevent interference between the two filaments as they were melted would have to be provided solely by the lateral spacing of the filaments, and as a result fewer filaments could be fed into a blast of given size than may be fed following the present invention.

This manner of feeding relatively different size filaments into the blast may be practiced either with a single blast emanating from a burner orifice of slot form, or with a series of spaced blasts emanating from a burner orifice in the form of closely spaced ports as shown in Figure 8. In the latter case, two or more differently sized filaments may be fed into each blast of the series.

Various modifications may be made within the spirit of the invention and the scope of the claims.

I claim:

1. The process of making glass fibers which comprises forming a gaseous blast having a temperature exceeding the attenuating temperature of glass and having a velocity that will draw out the heated glass into fibers, feeding an elongated body of glass in solidified state lengthwise into the blast from one side thereof and along a path extending transverse of the direction in which the blast travels after it passes the place of entry of said body into the blast, progressively heating the advancing end of the elongated body of glass to attenuating temperature by the heat of the blast and drawing out the heated end of the body in a direction transverse of the feeding direction of the body entering the blast into a fine glass fiber by the force of the blast, and maintaining the heated glass as it is being drawn out integral with the elongated body of glass to cause one end of the heated glass at the advancing end of the body to resist the drawing-out action of said blast so that the heated glass is drawn out to a fine fiber by the blast.

2. The process of making glass fibers which comprises substantially completely burning a combustible mixture of gases within a chamber and discharging the burned gases from the chamber, introducing the mixture of gases into the chamber at such a rate in relation to the volume of the chamber and restricting the discharge of burned gases from the chamber to such an extent with respect to the quantity of gas burned within the chamber as to force the burned gases from the chamber in the form of a blast having a temperature exceeding the attenuating temperature of glass and having a velocity that will draw out the heated glass into fibers, feeding an elongated body of glass in solidified state lengthwise into the blast from one side thereof and along a path extending transverse of the direction in which the blast moves after it passes the point of entry of the body into the blast, heating the advancing end of the glass body to attenuating temperature by the heat of the blast and by the force of the blast drawing out the heated glass into fibers in a direction transverse of the length of the glass body, and maintaining the heated portion of the glass body as it is being drawn out integral with the elongated body to cause one end of the heated glass to resist the drawing-out action of said blast so that the heated glass is pulled out to a fine fiber by the blast.

3. The process of making fine glass fibers which comprises feeding a combustible mixture of fuel and combustion-supporting gas into a first zone of a plurality of zones associated in series, substantially completely burning the fuel within the first zone, passing the products of combustion from said zone and into and through a second zone at a temperature that is above the attenuating temperature of the glass and at a velocity that will draw the glass continuously into fibers when the glass is subjected to the heat of the said products of combustion in said second zone, feeding an elongated body of glass endwise into the second zone through a path laterally offset from said first zone, said feeding being in a direction that is transverse of the direction of travel of the products of combustion through said second zone after they pass the place of entry of the elongated body into the zone, heating the advancing end of the body of glass by the heat of the products of combustion in said zone to a temperature sufficient to cause the glass to be drawn out by the velocity of the products of combustion passing through the zone, and attenuating the glass into fibers by the force of the products of combustion passing through said zone.

4. Apparatus for attenuating glass into fibers comprising, a burner having a combustion chamber within which a combustible mixture of gas is adapted to be burned and having an outlet opening from which is discharged a single blast of the products of the combustion in said chamber, said outlet opening having a cross-sectional area sufficiently smaller than the cross-sectional area of the space within which the gaseous mixture is burned to provide in a zone at the discharge side of the opening a blast that has a temperature which exceeds the attenuating temperature of the glass and through which the blast moves at a velocity that will draw out the heated glass into fibers, and means for feeding a body of glass into the blast from one side thereof and along a path laterally offset from said combustion chamber and extending transversely of the direction of travel of the blast after it passes the place of entry of the body of glass into the blast, said path of feeding of the body of glass intersecting the blast in proximity to the outlet opening of the combustion chamber.

5. The method of making fine glass fibers which comprises feeding a plurality of closely spaced parallelly arranged glass filaments of relatively different diameters into a gaseous blast that is at a temperature sufficiently high to melt the filaments and that moves at high velocity, said feeding direction being transversely of the direction of travel of the blast, the relative size of said filaments resulting in attenuation thereof at different extents of penetration of the filaments into the blast to thereby space apart the points where attenuation occurs within the blast.

6. The method of making fine glass fibers which comprises feeding a plurality of closely spaced parallelly arranged glass filaments into a gaseous blast that is at a temperature sufficiently high to melt the filaments and that moves at high velocity, said feeding direction being transversely of the direction of travel of the blast, said filaments being in pairs with the filaments of each pair being of relatively different diameters.

7. The method of making glass fibers which comprises flowing a plurality of streams of molten glass of relatively different cross-sectional areas, continuously drawing out and solidifying said streams to form filaments of relatively different diameters, feeding said filaments as they are attenuated in side by side closely spaced relationship into a gaseous blast of intense heat and moving at high velocity, the direction of feed of the filaments into the blast being transverse to the direction of travel of the blast, and melting and attenuating said filaments by the heat and force of the blast, the relative size of said filaments resulting in attenuation thereof at different extents of penetration of the filaments into the blast to thereby space apart the points where attenuation occurs within the blast.

8. Apparatus for making fine fibers comprising a burner for forming a high speed gaseous blast of intense heat, means for flowing a stream of molten glass from a supply thereof, and means for engaging said stream and movable in directions generally away from the said supply to attenuate the stream to a filament and in a direction that is generally transverse of the direction of the blast to feed the filament as it is attenuated into the gaseous blast in a direction at substantially a right angle to the direction of travel of the blast.

9. Apparatus for making fine glass fibers comprising a feeder for flowing streams of molten glass, means for attenuating said streams spaced from said feeder at a distance sufficient to cause the attenuated streams to solidify in the form of glass filaments, a burner including an enclosed chamber in which a combustible gaseous mixture is burned and a restricted port through which the products of combustion pass from said chamber into the atmosphere to form a high speed gaseous blast of intense heat, and means between said attenuating means and said burner for guiding the filaments into the gaseous blast discharging from said port in a direction at substantially a right angle to the direction of travel of the blast.

10. Apparatus for making fine glass fibers comprising a feeder for flowing streams of molten glass, means for attenuating said streams spaced from said feeder at a distance sufficient to cause the attenuated streams to solidify in the form of glass filaments, a burner including an enclosed chamber in which a combustible gaseous mixture is burned and a restricted port through which the products of combustion pass from said chamber into the atmosphere to form a high speed gaseous blast of intense heat, and a guide for the filaments adjacent the port of said burner arranged to guide the filaments into the gaseous blast discharging from said port, the filament-contacting portion of said guide in the vicinity of the blast being at substantially a right angle to the direction of travel of the blast.

11. Apparatus for making fine glass fibers which comprises a burner including an enclosed chamber in which a combustible gaseous mixture is burned, said burner having a series of spaced apart exhaust ports leading from said chamber to the atmosphere for exhausting the products of combustion from the chamber to form a plurality of blasts of intensely hot gas moving at high velocity, and means for feeding a plurality of elongated bodies of glass into said blasts with the bodies individual to said blasts, whereby said bodies are attenuated concurrently by the heat and force of said blasts.

12. Apparatus for making fine glass fibers which comprises a burner including an enclosed chamber in which a combustible gaseous mixture is burned, a series of parallelly arranged laterally spaced vertically elongated passages leading from said chamber to the atmosphere for exhausting the products of combustion from the chamber to form a plurality of spaced blasts of intensely hot gases moving in parallel paths at high velocity, and means for feeding a plurality of elongated bodies of glass into said spaced blasts with the filaments individual to said blasts, whereby said filaments are attenuated concurrently by the heat and force of said spaced blasts.

13. Apparatus for making glass fibers which comprises means for flowing a stream of molten glass, means for attenuating said stream continuously to continuously form a solid glass filament and to advance the filament in the direction of its length, a burner for forming a high speed gaseous blast of intense heat, and a guide between said attenuating means and said burner for guiding said advancing filament into the blast at a point adjacent the burner and in a direction at substantially a right angle to the direction of movement of said blast.

14. Apparatus for making glass fibers which comprises a feeder for molten glass and having orifices therein of relatively different sizes for flowing a plurality of molten glass streams of relatively different cross-sectional areas, attenuating means for engaging the streams and continuously drawing out said streams all at the same rate to form filaments of relatively different diameters and for feeding said filaments as they are attenuated in side by side closely spaced relation into a gaseous blast of intense heat and moving at high velocity, whereby the filaments are melted by the heat of the blast at points spaced apart in the direction of feed of the filaments and attenuated by the force of the blast.

15. Apparatus for making glass fibers which comprises a feeder for molten glass and having orifices therein of relatively different sizes for flowing a plurality of molten glass streams of relatively different cross-sectional areas, attenuating means for engaging the streams and continuously drawing out said streams all at the same rate to form filaments of relatively different diameters, and a guide for guiding said filaments as they are attenuated in side by side closely spaced relation into a gaseous blast of intense heat and moving at high velocity, whereby the filaments of different size are melted by the heat of the blast at points spaced apart in the direction of feed of the filaments and attenuated by the heat and force of the blast.

16. The process of making fibers from heat-softenable material which comprises flowing a stream of molten material from a supply body of molten material and solidifying the stream to form a filament, attenuating the stream of molten material prior to its solidification by applying a pulling force on the filament, and attenuating the filament thus formed to form fibers by projecting the filament endwise into a gaseous blast having a temperature in excess of the softening temperature of the material and having a velocity sufficient to draw out the softened material into fibers.

17. The process of making glass fibers which comprises flowing a stream of glass from a supply body of molten glass and solidifying the stream to form an elongated body of solid glass, burning a combustible gaseous mixture in a confined space and passing the products of combustion from said space and then through a zone at a temperature in excess of the softening temperature of the glass, progressively softening the advancing end of said body by feeding the body endwise into said zone along a path of travel extending transversely of the direction of movement of said products of combustion through said zone, and attenuating the softened body into fibres by the force of said products of combustion.

18. Apparatus for making glass fibers comprising a feeder having means for flowing a stream of molten glass, means for attenuating the stream spaced from the feeder a distance sufficient to cause the attenuated stream to solidify in the form of a filament before being engaged by the attenuating means, a gas burner having means for discharging the products of combustion in the form of a blast having a temperature in excess of the softening temperature of the glass and having a velocity sufficient to draw out the glass into fibers, said burner being so located with respect to the attenuating means that the filament leaving the attenuating means is fed by the latter into said blast along a path extending transversely of the direction of flow of the blast.

19. Apparatus for making fibers from heat-softenable material, comprising a feeder having means for flowing a stream of the material in molten state, means for engaging the stream and feeding the stream along a predetermined path, said feeding means being spaced from the feeder a distance sufficient to cause the stream to solidify in the form of a filament before being engaged by the feeding means, a burner having a chamber in which a combustible gaseous mixture is burned and having an outlet opening through which the products of combustion are discharged in the form of an intensely hot high velocity blast, and means between the feeding means and blast for guiding the filament into the blast along a path extending transversely to the direction of flow of the blast.

20. The process of making fibers from heat-softenable material which comprises burning a combustible gaseous mixture in a confined space and passing the products of combustion from said space through a zone in the form of a gaseous blast having a width substantially greater than its depth and having a temperature in said zone exceeding the softening temperature of the material, feeding a plurality of elongated bodies of the material in side by side relation endwise into the blast in said zone with the elongated bodies spaced laterally from each other crosswise of the blast, guiding the elongated bodies into the blast along a path extending substantially normal to the blast, moving the products of combustion through the zone at a velocity sufficiently high to draw out the material at the advancing ends of said bodies, and attenuating the material into fibers by the force of the blast passing through said zone.

21. Apparatus for attenuating glass into fibers comprising, a burner having a combustion chamber within which a combustible gaseous mixture is adapted to be burned and having an outlet opening of a width several times greater than its depth and through which the products of combustion are discharged in a wide, ribbon-like blast, said outlet opening having a cross-sectional area sufficiently smaller than the cross-sectional area of the space within which the gaseous mixture is burned to provide a zone at the discharge side of the opening in which the temperature of the blast exceeds the softening temperature of the glass and through which the blast moves at a velocity sufficiently high to draw out the softened glass into a fine fiber, means supported exteriorly of the burner for feeding a plurality of glass rods into said zone at such a rate that the rods entering the zone are melted in the blast and the molten glass is drawn out into fibers by the force of the blast, and a guide restraining movement of the rods into the blast along a path extending substantially normal to the blast and having means for positioning the rods in lateral spaced relation across the width of the blast.

CHARLES J. STALEGO.

REFERENCES CITED

The following references are of record in the file of this patent:

UNITED STATES PATENTS

| Number | Name | Date |
|---|---|---|
| 1,008,204 | Seghers | Nov. 7, 1911 |
| 1,049,314 | Neil | Dec. 31, 1912 |
| 1,157,984 | Herkenrath | Oct. 26, 1915 |
| 1,689,551 | Hammond | Oct. 30, 1928 |
| 2,068,203 | Simpson | Jan. 19, 1937 |
| 2,133,235 | Slayter | Oct. 11, 1938 |
| 2,133,238 | Slayter | Oct. 11, 1938 |
| 2,175,225 | Slayter | Oct. 10, 1939 |
| 2,228,150 | Norman, Jr. | Jan. 7, 1941 |
| 2,291,289 | Slayter et al. | July 28, 1942 |
| 2,335,135 | Staelin | Nov. 23, 1943 |